(12) United States Patent
Newman

(10) Patent No.: US 7,877,981 B2
(45) Date of Patent: Feb. 1, 2011

(54) CONTROL STRATEGY FOR TURBOCHARGED DIESEL ENGINE

(75) Inventor: Philip James Edward Newman, Bishop's Itchington (GB)

(73) Assignee: Ford Global Technologies, LLC, Dearborn, MI (US)

( * ) Notice: Subject to any disclaimer, the term of this patent is extended or adjusted under 35 U.S.C. 154(b) by 854 days.

(21) Appl. No.: 11/759,602

(22) Filed: Jun. 7, 2007

(65) Prior Publication Data
US 2007/0295001 A1 Dec. 27, 2007

(30) Foreign Application Priority Data
Jun. 23, 2006 (GB) .................. 0612394.7

(51) Int. Cl.
*F01N 5/04* (2006.01)
(52) U.S. Cl. .................. 60/280; 60/274; 60/292; 60/295; 60/311; 60/324; 60/602; 60/605.2; 60/612
(58) Field of Classification Search ............ 60/274, 60/278, 280, 286, 295, 297, 311, 602, 605.1, 60/605.2, 612, 292, 324
See application file for complete search history.

(56) References Cited

U.S. PATENT DOCUMENTS

| | | | | |
|---|---|---|---|---|
| 5,190,015 A * | 3/1993 | Nakata et al. | ............... | 123/520 |
| 6,397,598 B1 * | 6/2002 | Pierpont | ............... | 60/612 |
| 6,981,370 B2 * | 1/2006 | Opris et al. | ............... | 60/311 |
| 7,107,761 B2 * | 9/2006 | Fukuma et al. | ............... | 60/285 |
| 7,308,788 B1 * | 12/2007 | Das | ............... | 60/297 |
| 7,490,462 B2 * | 2/2009 | Roozenboom et al. | ............... | 60/278 |
| 2006/0021347 A1 | 2/2006 | Sun et al. | | |

FOREIGN PATENT DOCUMENTS

EP 1316698 6/2003

OTHER PUBLICATIONS

U.S. Appl. No. 11/232,531, filed Sep. 22, 2005, Spaeder et al.
U.S. Appl. No. 11/232,530, filed Sep. 22, 2005, Schorn et al.
U.S. Appl. No. 11/232,259.

* cited by examiner

*Primary Examiner*—Binh Q. Tran
(74) *Attorney, Agent, or Firm*—Allan J. Lippa; Alleman Hall McCoy Russell & Tuttle LLP

(57) ABSTRACT

The description relates to a control strategy for assisting regeneration of a particulate filter for a turbocharged diesel V-engine. The engine has two cylinder banks, a first cylinder bank coupled to a first exhaust pipe and a second cylinder bank coupled to a second exhaust pipe. The two exhaust pipes are in communication with one another by a connecting pipe and have two exhaust gas turbochargers each connected in a respective one of the exhaust pipes. The first exhaust pipe being provided with an exhaust shut-off valve in order to operate the engine either with a single turbocharger when the valve is in its closed position or with the two turbochargers when the valve is in its open position. The first exhaust pipe is connected to a diesel particulate filter (DPF) and the second exhaust pipe is connected to a diesel oxidation catalyst and to the DPF.

17 Claims, 1 Drawing Sheet

CONTROL STRATEGY FOR TURBOCHARGED DIESEL ENGINE

FIELD

The present description relates to a turbocharged diesel engine. The description relates also to control strategy for assisting regeneration of a particulate filter for such a turbocharged diesel engine, particularly a twin-turbocharged diesel engine.

SUMMARY

According to a first aspect of the description there is provided a turbocharged diesel engine having at least two cylinders which are configured in such a way that they form two cylinder banks with at least one cylinder in each bank, each cylinder bank having a respective exhaust pipe, and the two exhaust pipes being in communication with one another by a connecting pipe, and having two exhaust gas turbochargers each connected in a respective one of the exhaust pipes, one exhaust pipe being provided with an exhaust shut-off valve in order to operate the engine either with a single turbocharger when the valve is in its closed position or with the two turbochargers when the valve is in its open position, wherein the exhaust pipe provided with the exhaust valve is connected to a diesel particulate filter (DPF) and in that the other exhaust pipe is connected to a diesel oxidation catalyst and then to the DPF.

According to a second aspect of the description there is provided a control strategy for assisting regeneration of a particulate filter for a turbocharged diesel engine, the engine having at least two cylinders which are configured in such a way that they form two cylinder banks with at least one cylinder in each bank, each cylinder bank having a respective exhaust pipe, designated the low pressure (LP) exhaust pipe and the high pressure (HP) exhaust pipe, and the two exhaust pipes being in communication with one another by a connecting pipe, and having two exhaust gas turbochargers each connected in a respective one of the exhaust pipes, the LP exhaust pipe being provided with an exhaust shut-off valve in order to operate the engine either with a single turbocharger when the valve is in its closed position or with the two turbochargers when the valve is in its open position, the LP exhaust pipe being connected to a diesel particulate filter (DPF) and the HP exhaust pipe being connected to a diesel oxidation catalyst and to the DPF, the engine having a fuel injection system to execute a main injection and at least one post injection in each cylinder during each engine cycle, wherein the control strategy comprises the steps of controlling independently the post injection of each cylinder bank during regeneration of the DPF and depending upon the position of the exhaust valve.

Preferably, the post injection of the common rail injection system is controlled during regeneration of the DPF in such a way that when the exhaust valve is in its closed position, no late post-injection is executed within the cylinder bank connected to the LP exhaust pipe and that when the exhaust valve is its open position, one or more post-injections on the cylinder bank connected to the LP exhaust pipe is executed so as to supply a quantity of uncombusted fuel through the LP exhaust pipe to the DPF.

Preferably, when the engine has an exhaust gas recirculation (EGR) valve connected to the LP exhaust pipe, the strategy may further comprise the step of opening the EGR valve when the exhaust valve is closed during the regeneration of the DPF.

BRIEF DESCRIPTION OF THE DRAWINGS

The an embodiment of the description will now be described by way of example with reference to the accompanying drawings of which.

DETAILED DESCRIPTION

Figure 1:
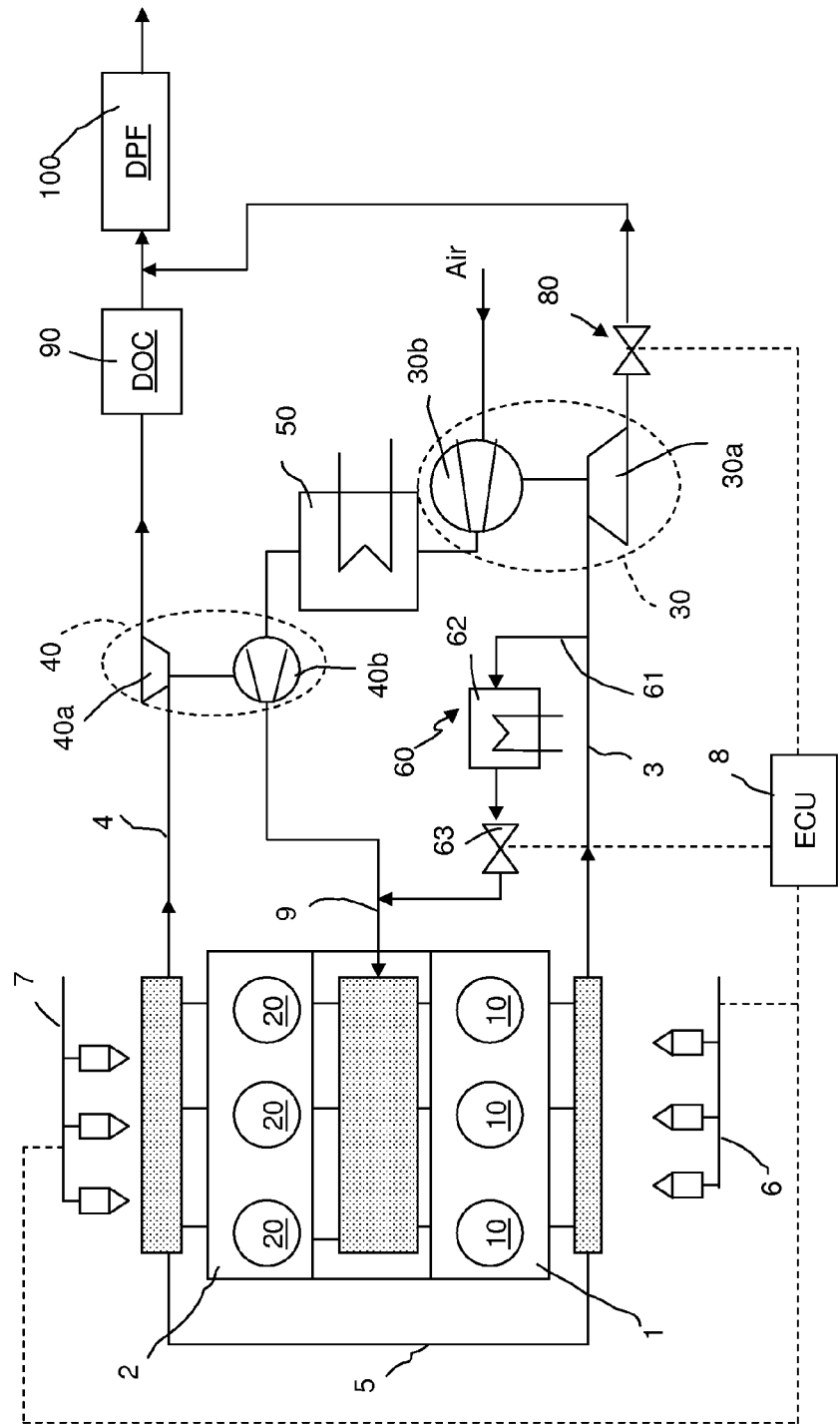
FIG. 1 is a schematic view of an exhaust gas treatment system for a turbocharged diesel engine.

There is shown, in FIG. 1, an internal combustion engine, in this example a six-cylinder diesel engine, which has two groups of three cylinders 10, 20 in two cylinder banks 1, 2. Each cylinder bank 1, 2 has an exhaust pipe 3, 4. A connecting pipe 5 is provided, by which the two exhaust pipes 3, 4 are in communication with one another.

The engine is provided with a common-rail fuel injection system 6, 7 allowing, in a known manner, during each engine cycle and inside each engine cylinder 10, 20 phased injections of fuel, such as for instance a pre injection (Pilot), a main injection (Main) and at least one post injection (POST). Each injection is controlled by an engine control unit ECU 8.

The engine also has two exhaust gas turbochargers 30, 40 each including a turbine 30a, 40a and a compressor 30b, 40b. The turbochargers 30, 40 are conveniently called the low pressure LP and the high pressure HP turbocharger. The turbine 30a of the LP turbocharger 30 is arranged in the exhaust pipe 3 of one cylinder bank 1, and the turbine 40a of the HP turbocharger 40 is arranged in the exhaust pipe 4 of the other cylinder bank 2.

The compressors 30b, 40b are arranged in a common intake duct 9 where the compressor 40b of the HP turbocharger 40 is arranged downstream of the compressor 30b of the LP turbocharger 30.

A charge-air cooler 50 is arranged between the compressors 30b, 40b in the common intake duct 9.

An exhaust-gas recirculation duct 60 is also provided. The exhaust gas recirculation duct 60 comprises a pipe 61 which is branched off upstream of the LP turbine 30a from the exhaust pipe 3 assigned to the LP turbine 30a and opening into the common intake duct 9. Provided in the pipe 61 is an EGR cooler 62 which reduces the temperature of the hot exhaust gas flow. An EGR valve 63 is arranged in this pipe 61 for controlling the exhaust gas recirculation rate. The EGR valve 63 is controlled by the engine control unit ECU 8.

An exhaust shut-off valve 80 is provided in the exhaust pipe 3 downstream of the LP turbine 30a. The exhaust shut-off valve 80 is controlled by the ECU 8 to operate the valve 80 according to the operating condition of the engine. This exhaust shut-off valve 80 allows operation of the engine according to two stages; i.e. with a single turbocharger 30 or with twin turbochargers 30 and 40 as will be explained in detail below.

The engine is provided also with an exhaust gas treatment system. This exhaust gas treatment system comprises a diesel oxidation catalyst (DOC) 90 which is provided in the exhaust pipe 4 downstream of the HP turbine 40a. The treatment system is also provided with a diesel particulate filter (DPF) 100 which is disposed downstream of the DOC 90 on the exhaust pipe 4. The exhaust pipe 3 is also connected to the DPF 100 and is branched off to the exhaust pipe 4 between the DOC 90 and the DPF 100.

The exhaust shut-off valve 80 is normally in its closed condition shutting off the pipe 3 to the LP turbine 30a so that all exhaust gas flow has to pass through the turbine 40a of the HP exhaust gas turbocharger 40, and to the DOC 90 and then to the DPF 100. The exhaust valve 80 will remain in its closed condition at low and medium engine speeds and loads to allow the second turbocharger 40 to operate close to its maximum efficiency.

In order to remove periodically the particulates which have accumulated within the DPF 100, a regeneration is performed in which the accumulated particulates are converted into carbon monoxide and carbon dioxide. To do so, one or more post-injections, in this example two post injections POST1 and POST2, are executed in each cylinder 10, 20 during the exhaust phase allowing a quantity of uncombusted fuel to reach the exhaust, thus increasing the hydrocarbons HC which are present in the exhaust and activating the DOC 90. An exothermic oxidation reaction which occurs inside the DOC 90 and will cause raising of the temperature of the exhaust gases at the inlet of the DPF 100 and thus allowing regeneration of the particulate filter 100. One disadvantage of such control of the injection is that it increases heating on the cylinder bank 10 connected to the LP turbocharger 30 due to the hydrocarbon HC content of the exhaust gas in this bank 1.

At higher engine speeds and loads the exhaust shut-off valve 80 is then controlled towards its open condition, by the ECU 8, where the exhaust gas flow is also passed through the turbine 30a of the LP turbocharger 30 which thus can be designed for large exhaust gas mass flows. It will be appreciated that in this operating stage of the engine, where the engine is running with two turbochargers 30, 40, about 70% of the exhaust gas flow passes through the LP turbocharger 30 and about 30% through the HP turbocharger 40. However, it has been found that without a diesel oxidation catalyst after the LP turbocharger 30 it is difficult to provide enough heat to the DPF 100 in order to perform a regeneration of the particulate filter, each regeneration requiring a temperature higher than about 600° C. Furthermore, it has also been found that since most of exhaust gas flow passes through the LP turbocharger 30, the level of late post injection that is required is relatively high and this can degrade the DOC 90 efficiency.

To overcome these issues, a control strategy is provided which assists regeneration of the particulates of DPF 100 depending upon the status of the exhaust shut-off valve 80. The control strategy comprises independent control of the post injection quantity and timing in each bank of cylinders 1, 2. Hence, when the exhaust shut-off valve 80 is in its closed position, the late post injection POST2 in the cylinder bank 1 connected to the LP turbocharger 30 is removed. When the exhaust valve 80 is in its open position, one or more post injections on the cylinder bank 1 connected to the LP turbocharger are executed during the exhaust phase of the engine cycle so as to supply a quantity of fuel not combusted through the exhaust pipe 3 and then to the DPF 100 causing an internal exothermic reaction which creates enough heat to regenerate the DPF 100.

By providing such a control strategy several advantages are obtained. Firstly, by removing late post injection the consumption of fuel is reduced. Secondly, the regeneration of the DPF 100 is made easier since a quantity of fuel can be provided to the DPF. Thirdly, the robustness of the engine is improved by reducing heat at the cylinder bank connected to the LP turbocharger when the exhaust valve is closed. Furthermore, tests have proven that late post injection on a single bank does not effect engine torque unbalance.

In addition, the control strategy also comprises the control of the EGR valve 63 by the ECU 8 when the exhaust shut-off valve 80 is closed and during the regeneration of the DPF 100. Since there is no late post injection in the cylinder bank 1 connected to the LP turbocharger 30, there is a reduced level of hydrocarbons in the manifold of this cylinder bank 10 and a lower temperature on this cylinder bank 10 allowing the EGR valve 63 to be opened without risk of damaging the EGR, the manifold and thus the engine. This control of the EGR valve 63 during regeneration of the DPF 100 helps to reduce nitrogen oxides (NOx).

Although the description has been described by way of example with reference to a specific embodiment of the description various modifications may be made without departing from the description. For example, the turbocharged diesel engine could be a V8 engine. Alternatively, the HP turbocharger could be provided with an EGR and an additional charge-air cooler could be added without modifying the control strategy according to the present description. In addition, the exhaust valve could be located upstream of the LP turbine 30a.

The invention claimed is:

1. A system for operating a turbocharged diesel engine, the system comprising:
    a first and a second bank of cylinders, each of said first and said second cylinder banks having at least a cylinder;
    a first exhaust pipe coupled to said first cylinder bank and a second exhaust pipe coupled to said second cylinder bank, said first exhaust pipe coupled to said second exhaust pipe by a connecting pipe;
    a first turbocharger coupled to said first exhaust pipe and a second turbocharger coupled to said second exhaust pipe;
    an oxidation catalyst located downstream of said first turbocharger;
    a particulate filter located downstream of said oxidation catalyst;
    where exhaust gases flow from said first turbocharger to the oxidation catalyst via the first exhaust pipe and exhaust gases flow from said oxidation catalyst to the particulate filter, and where exhaust gases flow from said second turbocharger to a location downstream of said oxidation catalyst and upstream of said particulate filter via the second exhaust pipe; and
    a valve located in said second exhaust pipe, said valve determining whether said engine operates with said first turbocharger or with said first and said second turbochargers.

2. The system of claim 1 further comprising an engine controller to open and close said valve.

3. The system of claim 1 wherein said valve is located downstream of said second turbocharger.

4. The system of claim 1 wherein a compressor outlet of said second turbocharger feeds a compressor inlet of said first turbocharger.

5. The system of claim 4 wherein an intercooler is between said compressor outlet of said second turbocharger and said compressor inlet of said first turbocharger.

6. A method for regeneration of a particulate filter for a turbocharged diesel engine, the method comprising:
    operating an engine in a first mode during a first condition, wherein exhaust gases from a first cylinder bank and exhaust gases from a second cylinder bank are routed through a first turbocharger, said first turbocharger located in an exhaust pipe downstream of said first cylinder bank, exhaust gases exiting said first turbocharger routed through an oxidation catalyst located downstream of said first turbocharger, and said exhaust gases from said first cylinder bank and exhaust gases exiting said oxidation catalyst routed to a particulate filter located downstream of said oxidation catalyst; and
    operating said engine in a second mode during a second condition wherein exhaust gases flow from said first cylinder bank are routed through said first turbocharger, exhaust gases exiting said first turbocharger are routed to said oxidation catalyst, gases exiting said oxidation catalyst are routed to a particulate filter, a portion of exhaust gases flow from said second cylinder bank and are routed through a second turbocharger, and exhaust gases exiting said second turbocharger are routed to said particulate filter downstream of said oxidation catalyst.

7. The method of claim 6 wherein exhaust gases from said second cylinder bank are further routed to said first turbocharger.

8. The method of claim 6 wherein said second mode includes injecting fuel to each cylinder of said second cylinder group after combustion in the respective cylinders.

9. The method of claim 6 wherein exhaust gases flowing from said second cylinder bank are directed by a valve in an exhaust pipe.

10. The method of claim 6 further comprising an exhaust valve while in a closed position limits the flow of exhaust gases through said second turbocharger.

11. The method of claim 10 further comprising opening an EGR valve when said exhaust valve is closed.

12. A method for regeneration of a particulate filter for a turbocharged diesel engine, the method comprising:
   operating a first and second group of cylinders;
   directing exhaust gases from said first group of cylinders to an inlet of an oxidation catalyst and directing exhaust gases from an outlet of said oxidation catalyst to the particulate filter; and
   directing a portion of richened exhaust gases from said second group of cylinders to the inlet of said oxidation catalyst and directing a portion of richened exhaust gases from second group of cylinders to an inlet of said particulate filter bypassing said oxidation catalyst.

13. The method of claim 12 further comprising a first turbocharger located in an exhaust pipe between said first cylinder group and said oxidation catalyst, a second turbocharger located between said second turbocharger and said particulate filter.

14. A method in an engine, comprising:
   directing exhaust gas from a first cylinder group to a first turbocharger and then to an oxidation catalyst; and
   directing exhaust gas from a second cylinder group to a second turbocharger and then to a particulate filter downstream of the oxidation catalyst, bypassing the oxidation catalyst;
   where a compressor outlet of said second turbocharger feeds a compressor inlet of said first turbocharger.

15. The method of claim 14 further comprising executing a post combustion fuel injection in at least one of the second group of cylinders to enrich the exhaust gas that is output from the second group of cylinders.

16. The method of claim 14, where directing the exhaust gas from the second group of cylinders to a second turbocharger and then to the particulate filter includes directing the exhaust gas with a valve.

17. The method of claim 16, further comprising closing said valve and directing exhaust gas to said first turbocharger after a regeneration of said particulate filter is complete.

* * * * *